Aug. 17, 1965   H. S. HARRISON   3,200,768
CONVEYOR SYSTEM WITH ACCUMULATING TROLLEY UNITS
Filed Sept. 4, 1963   3 Sheets-Sheet 1
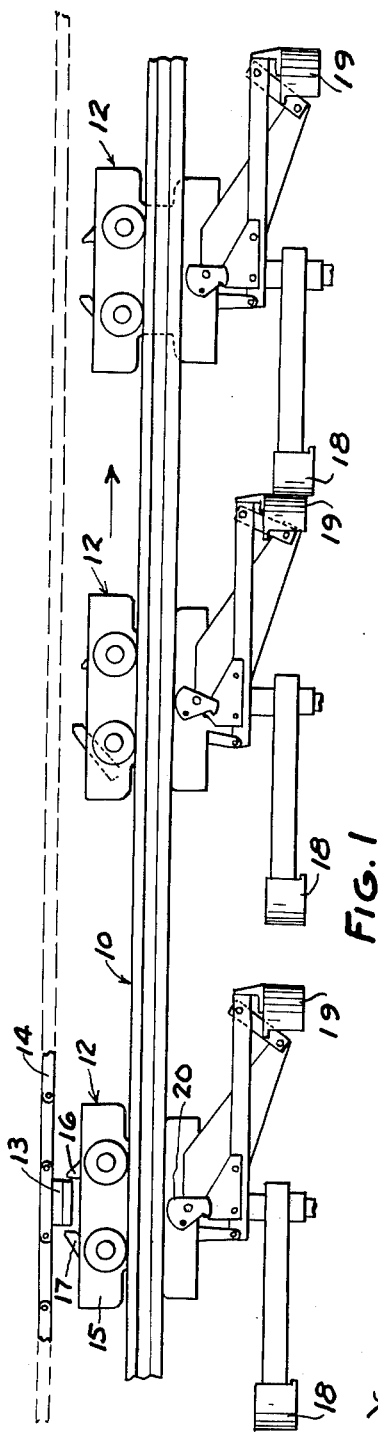
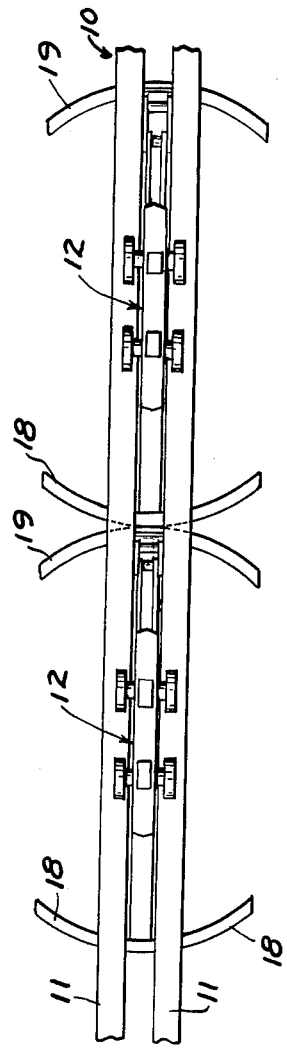
INVENTOR.
HOMER S. HARRISON
BY
ATTORNEYS

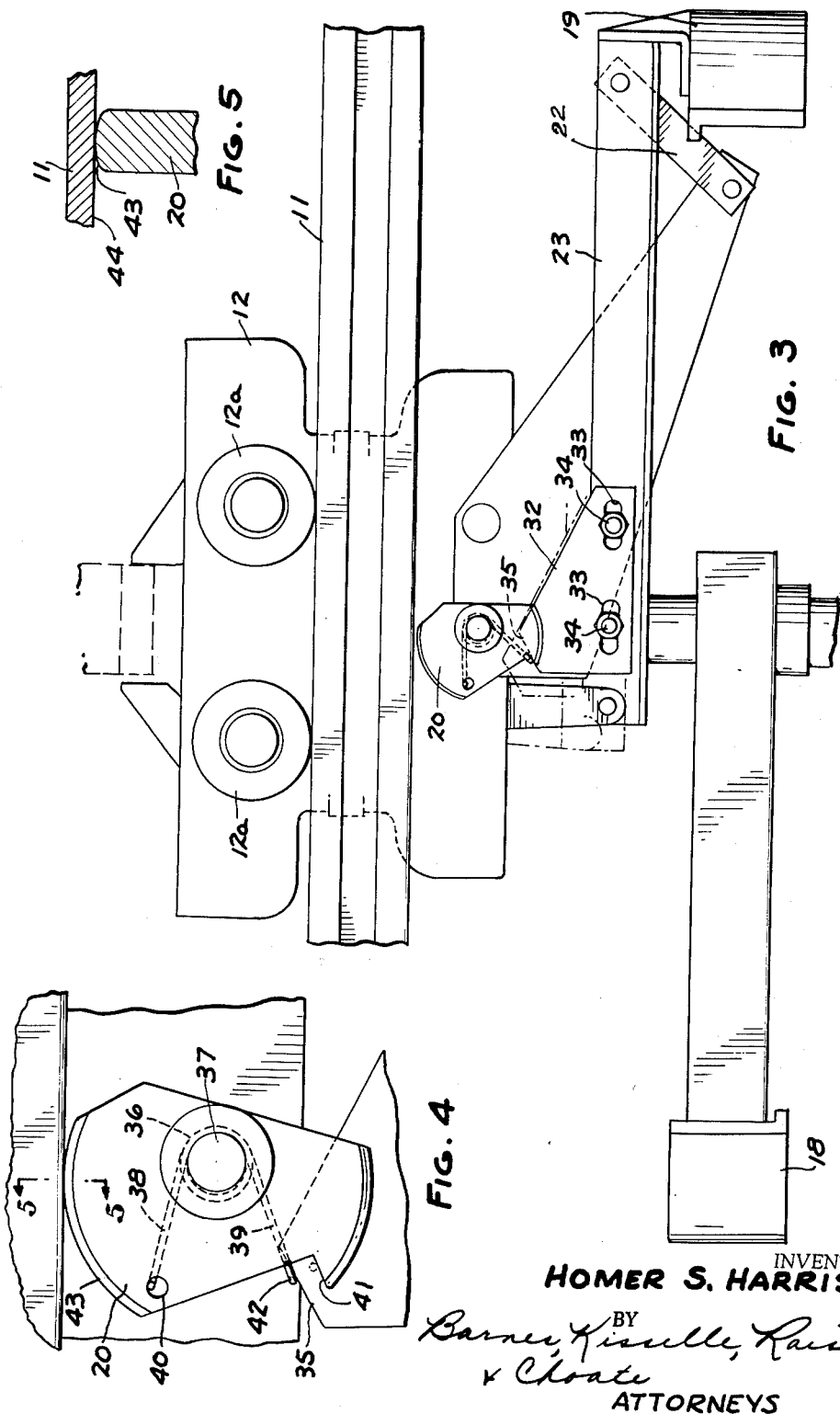

Aug. 17, 1965   H. S. HARRISON   3,200,768
CONVEYOR SYSTEM WITH ACCUMULATING TROLLEY UNITS
Filed Sept. 4, 1963   3 Sheets-Sheet 3
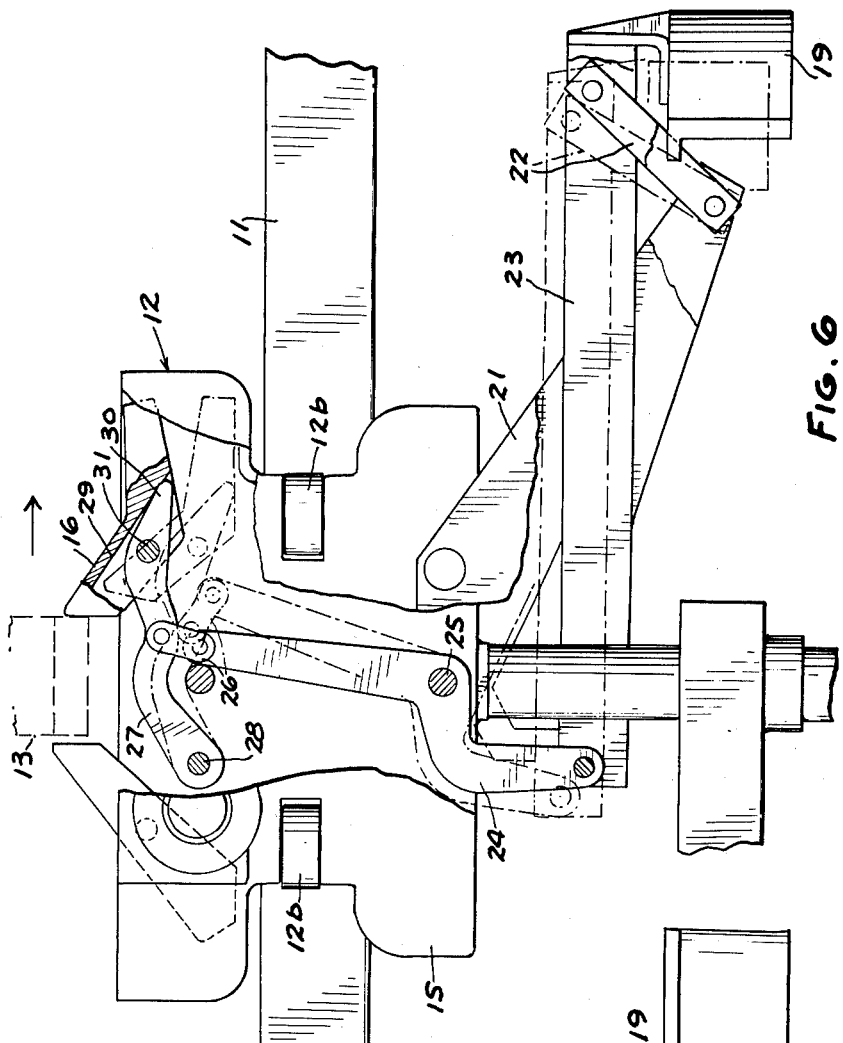
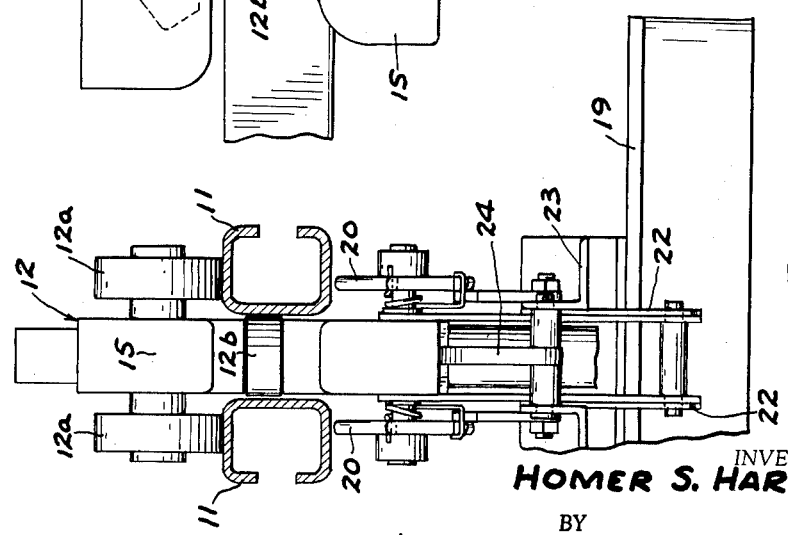
INVENTOR.
HOMER S. HARRISON
BY
ATTORNEYS United States Patent Office 3,200,768
Patented Aug. 17, 1965

3,200,768
CONVEYOR SYSTEM WITH ACCUMULATING
TROLLEY UNITS
Homer S. Harrison, Detroit, Mich., assignor to Mechanical Handling Systems, Inc., Detroit, Mich., a corporation of Michigan
Filed Sept. 4, 1963, Ser. No. 306,446
20 Claims. (Cl. 104—172)

This invention relates to conveyor systems and particularly to conveyor systems of the overhead power and free conveyor type.

In overhead power and free conveyors, a plurality of trolley units are moved along a track by an endless conveyor chain which has lugs thereon that engage pusher dogs on the trolley units. It has heretofore been suggested that the pusher dog on the trolley unit be retracted out of engagement with a lug on the conveyor chain when an obstacle is encountered along the track to permit the successive trolley units to accumulate on the track. A major problem with regard to such accumulating trolley units is that as a trolley unit encounters an obstacle and the pusher dog is retracted, the trolley unit tends to bounce back or rebound so that the pusher dog is no longer retracted. Subsequent movement of a lug on the conveyor chain engages the pusher dog to once again move the trolley unit against the obstacle. This results in a successive picking up and rebounding of the trolley unit with resultant noise and shock in the system.

It is an object of this invention to provide a conveyor system wherein the trolley units are prevented from moving rearwardly with relation to the track upon engagement with an obstacle and retraction of the pusher dog.

It is a further object of the invention to provide such a system wherein the shock load on the trolley unit and noises are minimized.

It is a further object of the invention to provide such a system which is relatively simple, low in cost and reliable.

In the drawings:

FIG. 1 is a fragmentary side elevation of a conveyor system embodying the invention.

FIG. 2 is a fragmentary plan view of a portion of the system shown in FIG. 1.

FIG. 3 is a side elevation of a trolley unit embodying the invention.

FIG. 4 is a fragmentary side elevation on an enlarged scale of a portion of the trolley unit shown in FIG. 3 showing the parts in a different operative position.

FIG. 5 is a fragmentary sectional view taken along the line 5—5 in FIG. 4.

FIG. 6 is a side elevation of the trolley unit similar to FIG. 3, parts being broken away and shown in section.

FIG. 7 is a fragmentary rear elevation of the trolley unit shown in FIG. 6.

Referring to FIGS. 1 and 2, the conveyor system embodying the invention comprises a trolley carrying track 10 consisting of spaced rails 11 along which trolley units 12 are adapted to be moved by engagement with the lugs 13 of a conveyor chain 14 that is supported in overlying relation to the track 10 in accordance with well-known practice. Each trolley 12 has rollers 12a on the sides thereof which engage the top of rails 11 and rollers 12b which engage the sides of rails 11. Each trolley unit is adapted to support a load suspended thereon in any well-known manner.

Each trolley unit 12 includes a body 15 having a movable pusher dog 16 and a pivoted flipper dog 17. As a trolley unit 12 is supported along the track 10 and a lug 13 on chain 14 moves into position, lug 13 momentarily swings the flipper dog 17 out of the way and engages the pusher dog 16 to move the trolley unit 12 along the track 10.

Each trolley unit 12 supports a fixed rear bumper 18 and a movable front bumper 19. When the movable front bumper 19 encounters an obstacle, as for example the rear bumper 18 of a preceding trolley, the rearward movement of the bumper 19 retracts pusher dog 16 to prevent further forward movement of the trolley 12 by the lug 13 and permits the lug 13 on the chain 14 to move along past the trolley unit.

In addition, this rearward movement of the front bumper 19 causes cams 20, which are pivoted on the trolley body 15, to be pivoted upwardly into engagement with the underside of the track rails 11 and lock the trolley unit 12 against rebounding movement rearwardly.

Referring to FIGS. 6 and 7, a pair of bracket arms 21 are mounted on the trolley body 15 and extend downwardly and forwardly therefrom. A pair of bumper supporting levers 22 are provided on the forward end of bracket arms 21 and extend upwardly and forwardly. A fixed longitudinal bar 23 is fixed on bumper 18 and forward ends of the pivot levers 22 are pivoted to bar 23. As shown in FIG. 2, front bumper 19 and rear bumper 18 are arcuate in plan view so that they will engage even though the trolley units are on a curved portion of the track.

Fixed bar 23 extends rearwardly from the front bumper 19 and is pivoted to the lower end of a rear lever 24. Lever 24 is pivoted to the trolley body by a pin 25. The upper end of rear lever 24 extends upwardly and forwardly and is pivotally connected by a link 26 to a pusher dog pivot lever 27 that is pivoted to the trolley body 15 by a pin 28 and extends forwardly of the trolley body 15. The pusher dog 16 has a hollow cut-out portion 29 into which the forward end 30 of the pusher dog pivot lever extends. A pin 31 pivots the pusher dog 16 to the forward end.

As shown in FIG. 6, when the bumper rail 19 strikes an obstacle, it swings upwardly and rearwardly on levers 22 and 24 to the dotted line position, pivoting the upper end of the lever 24 forwardly and swinging the pusher dog lever 27 downwardly to move the pusher dog 16 out of the path of the lug 13 on the conveyor chain.

Referring to FIG. 3, plates 32 are mounted on sides of bar 23. Each plate 32 is provided with a pair of elongated slots 33 through which bolts 34 extend so that the plates 32 can be adjustably mounted longitudinally of the bar 23. Each plate 32 includes a surface 35 that extends downwardly and rearwardly. As shown in FIGS. 4 and 7, a torsion spring 36 is mounted on each end of a pin 37 on body 15 on which the cams 20 are pivoted. Each torsion spring 36 includes a plurality of center coils and arms 38, 39. The free end of each arm 38 engages an opening 40 in the cam 20 and the free end 42 of arm 39 engages either the edge 35 or a notch 41 on the cam 20.

When the bumper 19 is moved upwardly and rearwardly, the edges 35 on the plates 32 engage the ends 42 of the torsion springs 36 to rotate the cam 20 clockwise as viewed in FIGS. 3 and 4 to bring the upper edge 43 thereof into engagement with the underside 44 of the rails 11. As shown in FIG. 5, the upper edge 43 of each cam 20 is curved in transverse cross section to provide a limited area, preferably of line contact, with the underside 44 of the rail 11 so that a concentrated force is applied to prevent further rearward movement of the trolley 12 along the track.

Further movement 19 of the bumper upwardly and rearwardly causes a further tensioning of the spring 36 so that the shock is partially absorbed and not transferred directly to the trolley body 15.

When the obstacle on the front bumper 19 is removed, the end of the torsion spring 36 is permitted to move against the notch 41 as a stop, and all force tending to rotate the cam is relieved. The cam 20 is so arranged that a major portion of its weight is off center and tends to move it out of engagement with the underside of the rail 11.

It can thus be seen that there has been provided a system wherein each trolley unit is positively locked against rearward movement or rebound upon encountering an obstacle, thereby eliminating the noise and shock in the system which would occur if the trolley unit were permitted to rebound and be successively picked up once again by a lug on the conveyor chain.

I claim:

1. In a conveyor system, the combination comprising
 a track,
 a plurality of trolley units movable along said track,
 each said trolley unit being provided with a pusher dog which is movable to and from driving and retracted positions,
 a rear bumper and a front bumper on each said trolley unit,
 said front bumper being movable rearwardly upon engagement with an obstacle,
 means on each said trolley unit actuated by rearward movement of the front bumper to retract said movable pusher dog,
 and cam means on each said trolley unit operated by movement of said front bumper to engage and lock said trolley unit relative to said track to prevent rearward movement of said trolley unit along said track.

2. The combination set forth in claim 1 including resilient means between said front bumper and said cam means for minimizing the shock on said trolley units.

3. In a conveyor system, the combination comprising
 a track,
 a plurality of trolley units movable along said track,
 each said trolley unit being provided with a pusher dog which is movable to and from driving and retracting positions,
 a rear bumper and a front bumper on each said trolley unit,
 said front bumper being movable rearwardly upon engagement with an obstacle,
 means on each said trolley unit actuated by rearward movement of the front bumper to retract said movable pusher dog,
 a cam member pivoted on each said trolley unit,
 and means operated by movement of said front bumper to pivot said cam member into engagement with said track to prevent rearward movement of said trolley unit along said track.

4. The combination set forth in claim 3 wherein said cam means includes a member having a curved portion for engaging said track to provide a concentrated pressure area.

5. In a conveyor system, the combination comprising
 a track,
 a plurality of trolley units movable along said track,
 each said trolley unit being provided with a pusher dog which is movable to and from driving and retracting positions,
 a rear bumper and a front bumper on each said trolley unit,
 said front bumper being movable rearwardly upon engagement with an obstacle,
 means on each said trolley unit actuated by rearward movement of the front bumper to retract said movable pusher dog,
 a cam member pivoted on each said trolley unit,
 and means operated by movement of said front bumper to pivot said cam member into engagement with the underside of said track to prevent rearward movement of said trolley unit along said track.

6. The combination set forth in claim 5 wherein including means for mounting said front bumper includes
 a forward lever pivoted to said trolley unit and extending upwardly and forwardly,
 means for pivoting said bumper on the upper forward end of said lever,
 a second lever pivoted to said trolley unit,
 means for pivoting said front bumper to the lower end of said second lever,
 the upper end of said second lever being adapted to be moved forwardly upon engagement of the front bumper with an obstacle,
 a pusher dog lever pivoted to said trolley unit,
 said pusher dog of said trolley unit being engaged by said pusher dog lever,
 and means for pivoting the upper end of said second lever to said pusher dog lever.

7. The combination set forth in claim 6 including means for pivoting said pusher dog to said pusher dog lever.

8. The combination set forth in claim 5 wherein said cam member has a portion thereof adapted to be moved upwardly into engagement with the underside of a rail,
 spring means between the bumper and the cam member whereby when said bumper is actuated, said cam member is rotated by means of said spring means into locking engagement with said track, continued movement of said bumper being utilized to energize said spring means.

9. The combination set forth in claim 8 wherein said cam member is arcuate in transverse cross section.

10. The combination set forth in claim 8 wherein said spring comprises a torsion spring including a plurality of coils and a pair of arms extending from the ends of said coils,
 one of said arms engaging said cam member and the other of said arms being engaged by said bumper.

11. In a conveyor system, the combination comprising
 a track comprising spaced rails,
 a plurality of trolley units movable along said track,
 each said trolley unit being provided with a movable pusher dog which is movable to and from a driving and retracting position,
 each said trolley unit being provided with a rear bumper and a front bumper,
 said front bumper being movable rearwardly upon engagement with an obstacle,
 means on each said trolley unit actuated by rearward movement of the front bumper to retract said movable pusher dog,
 and cam means on each said trolley unit operated by movement of said front bumper to engage the underside of said rails and lock said trolley unit relative to said track to prevent rearward movement of said trolley unit along said track.

12. The combination set forth in claim 11 wherein said cam means includes a cam member pivoted to each side of said trolley unit,
 each said cam member having a portion thereof adapted to be moved upwardly into engagement with the underside of a rail,
 spring means between the bumper and the cam member whereby when said bumper is actuated, said cam member is rotated by means of said spring means into locking engagement with said track, continued movement of said bumper being utilized to energize said spring means.

13. The combination set forth in claim 12 wherein said cam member is arcuate in transverse cross section.

14. For use in a conveyor system comprising a track and a plurality of trolley units movable along said track, each said trolley unit being provided with a movable pusher dog which is movable to and from a driving and retracting position, a trolley unit provided with a rear bumper and a front bumper, said front bumper being movable rearwardly upon engagement with an obstacle, means on said trolley unit actuated by rearward movement of the front bumper to retract said movable pusher dog, and cam means operated by movement of said front bumper to engage and lock said trolley unit relative to said track to prevent further movement of said trolley unit along said track.

15. The combination set forth in claim 14 including resilient lost motion means between said front bumper and said cam means.

16. The combination set forth in claim 14 wherein said cam means includes a member having a curved portion for engaging said track to provide a concentrated pressure area.

17. The combination set forth in claim 16 including means for mounting said front bumper comprising a forward lever pivoted to said trolley unit and extending upwardly and forwardly, means for pivoting said bumper on the upper forward end of said lever, a second lever pivoted to said trolley unit, said bumper being pivoted to the lower end of said second lever, the upper end of said second lever being adapted to be moved forwardly upon engagement of the front of the front bumper with a trolley unit, a pusher dog lever pivoted to said trolley unit, said pusher dog being engaged by said pivoted dog lever, and means for pivoting the upper end of said second lever to said pivoted dog lever.

18. The combination set forth in claim 16 wherein said cam means includes a cam member pivoted to said trolley unit and having a portion thereof adapted to be moved upwardly into engagement with the underside of the track, spring means between the bumper and the cam member whereby when said bumper is actuated, said cam member is rotated by means of said spring means into locking engagement with said track, continued movement of said bumper being utilized to energize said spring means.

19. The combination set forth in claim 18 wherein said cam member is arcuate in transverse cross section.

20. The combination set forth in claim 18 wherein said spring means comprises a torsion spring including a plurality of coils and a pair of arms extending from the ends of said coils, one of said arms engaging said cam member and the other of said arms being engaged by said bumper.

References Cited by the Examiner

UNITED STATES PATENTS

| | | |
|---|---|---|
| 878,484 | 2/08 | Moore. |
| 2,885,969 | 5/59 | Kay et al. _____ 104—172 |
| 3,044,416 | 7/62 | Reibel et al. _____ 104—172 |

EUGENE G. BOTZ, *Primary Examiner.*

LEO QUACKENBUSH, *Examiner.*